June 16, 1942.  V. F. GREAVES  2,287,005
PARTITION MEANS
Filed July 15, 1940
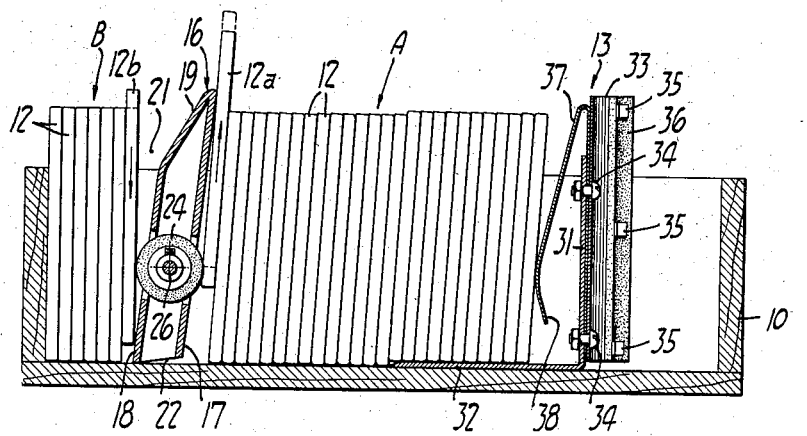
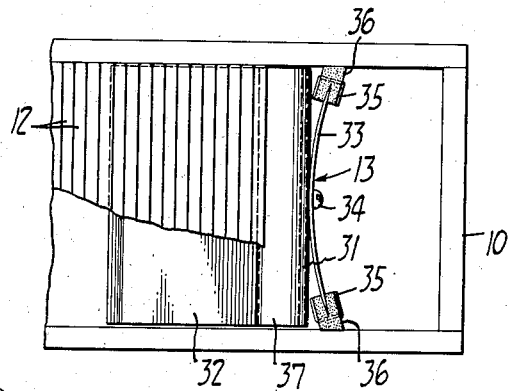
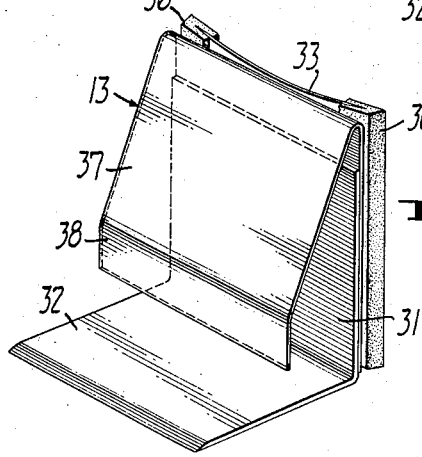
INVENTOR
Valentine F. Greaves
BY
ATTORNEY Patented June 16, 1942

2,287,005

UNITED STATES PATENT OFFICE 2,287,005

PARTITION MEANS

Valentine F. Greaves, Oakland, Calif.

Application July 15, 1940, Serial No. 345,550

3 Claims. (Cl. 211—184)

This invention relates to equipment for use in the storage and handling of material such as projection slides when arranged in a desired sequence, and is concerned more particularly with the provision of an improved partition means whereby the slides of a series can be maintained in the desired positions and relation irrespective of the removal of one or more slides of the group and to facilitate the operation of progressively selecting and elevating slides for removal in the projection operation, for example, with a progressive separator of the type disclosed and claimed in my co-pending application, Serial No. 334,860, filed May 13, 1940, and patented October 14, 1941, as Patent No. 2,258,984.

It is an object of the invention to provide an improved spring partition means for use with a series of elements such as projection slides.

Another object of the invention is to provide improved means for applying the desired pressure to a series of slides to facilitate progressive selection and elevation of such slides for use.

Other objects and advantages of the invention will be apparent from the following description of certain preferred embodiments thereof as illustrated in the accompanying drawing, in which:

Figure 1 is a longitudinal sectional view partially in elevation showing the spring partition member in place in a series of pre-arranged slides in their container.

Figure 2 is a plan view of the device in its relation to the series of slides.

Figure 3 is a perspective view of the spring partition member.

Referring to Figures 1 and 2, a container or box 10 is shown having a series of projection slides 12 which fit loosely within the box and project above its side walls. Any desired number of projection slides may be installed in the box which can have its storage capacity effectively shortened by means of a spring partition member 13 described more particularly hereinafter.

To effect the progressive selection and elevation of the series of slides, a progressive separator of the type disclosed in said application is shown at 16. Generally, the separator 16 is provided with opposite side walls 17 and 18 which are disposed adjacent the group of slides being projected and the group of slides which have been projected respectively. The side wall 18 is of less height than the side wall 17 and merges at its upper end with an inclined wall 19 which diverges from the adjacent slide 12 to provide an opening 21 for return of slides after use. The lower ends of the respective walls 17 and 18 are preferably of different heights from the bottom of the box to provide an inclined bottom surface 22 with its lowermost edge adjacent the projected slides.

To provide for automatic elevation of the next slide to be projected upon return of a projected slide, the respective side walls 17 and 18 are provided with suitable openings through which respective rollers 24 project. The rollers 24 are secured in any convenient manner upon a transverse shaft 26 which is suitably journaled in the walls of the separator about an axis which is offset slightly towards the group of projected slides or toward the wall 18, say for $1/64$ of an inch, so that a greater portion of the periphery of a roller is provided for engagement with the slide being returned to provide a correspondingly greater amount of rotation of the roller in elevating the next slide to be elevated.

The rollers 24 may be formed with friction surfaces of any suitable material such as rubber, and project beyond the respective side walls to engage the adjacent slides of the group of slides to be projected A and the projected group of slides B. Upon return of a slide into the group B, for example as indicated at 12b, the rollers 24 are rotated to in turn effect elevation of the adjacent slide 12a of the group A. After removal of the slide 12a, the separator 16 will fall against the next adjacent slide of the group A and for this purpose, if desired, its center of gravity is placed closer to the wall 17 than the wall 18.

The above described sequence of operations continues as the slides are successively moved from group A, used, and returned to group B, the separator 16 progressing along the box as the slides are successively removed from the group A and returned to the group B.

In order to accommodate varying numbers of slides in the group and to maintain the proper endwise pressure on the series of slides to insure successful and efficient operation of the roller elevators 24, the spring partition member 13 of special construction is provided. Generally, the spring partition member includes means for holding the partition member frictionally in the desired position in the box, means for maintaining the parallel relation of the partition member to the projection slides, and spring means for exerting endwise pressure on the series of slides to maintain the desired pressure relation between the slides and the progressive separator.

In the embodiment shown, the member 13 includes an L-shaped frame having an upright portion 31 and a base portion 32. The width of the frame is preferably such as to slide freely in the box, while the length of the base portion 32 is sufficient to maintain the partition member parallel to the slides.

In order to releasably secure the partition member in place in the box, a transversely arcuate spring clamp 33 is suitably secured as by bolts 34 to the upright portion 31 of the frame so that its outer edges diverge from such upright portion. At its outer edges the spring member 33 is provided with frictional gripping means which may be in the form of rubber strips 36 which may be slotted to engage over the edges of the clamp 33 and may be secured thereto as by means of suitable U-shaped clamps 35 which pierce the rubber strips and embrace the opposite edges thereof overlapping the spring clamp 33. The box-engaging faces of the friction strips 36 are formed at a suitable angle to the adjacent faces thereof to provide for flush engagement with the walls of the box. The construction is such that the spring clamp 33 must be bent slightly when being placed in the box so that the friction strips 36 are urged by spring pressure against the smooth side walls of the box 10. In this way the partition member may be frictionally held in the desired adjusted position and can be readily removed and inserted.

In order to apply endwise pressure to the series of projection slides, the partition member is provided with spring means in the form of a V-shaped spring member 37. Member 37 has one arm secured by bolts 34 to upright portion 31 of the frame and the other arm projecting downwardly toward frame base 32 and terminating in a bent portion 38 forming a face for engagement with the adjacent slide of a series. Face 38 lies substantially in the horizontal level of the rollers 24. The strength of the spring member 37 and the extent of flexing thereof provides for the desired pressure on the slides irrespective of the removal of a few of the slides from the series.

In operation, the partition member 13 is placed in the box and the required number of slides together with the progressive separator 16 are also placed therein, and the partition member 13 is moved along the box until the slack is taken up between the slides and they are held in position with a light pressure, so that the rollers 24 are engaged by the adjacent slides 12, as shown in Figure 1, for example. Subsequently, as the slides are inserted and removed, the spring member 37 of the partition member can yield while maintaining the desired pressure on the group of slides. Usually, the number of slides required to prime a projector will be removed before the spring partition member is inserted. However, if desired, the entire group of slides can be placed in the box and the slides required to prime the projector can be removed. The expansion of the spring member 37 will be sufficient to allow the removal of such slides without readjustment of the partition member or loss of the desired pressure on the series of slides.

I claim:

1. A partition member for use in a container with a series of projection slides or the like, said partition member having means to frictionally engage the side walls of the container to hold the partition member in place, means for maintaining said partition member substantially parallel to the slides in the container, and spring means on said partition member for exerting endwise pressure on said series of slides.

2. A partition member for use in a container with a series of projection slides or the like, said partition member having releasable means to frictionally engage the side walls of the container to hold the partition member in place, means for maintaining said partition member substantially parallel to the slides in the container, and spring means on said partition member for exerting endwise pressure on said slides, said spring means being expansible and contractible to accommodate the removal or insertion of slides.

3. A partition member for use in a box with a series of projection slides or the like comprising a frame having means to slidably engage the walls of the box for maintaining the partition member in parallel relation to the series of slides, a transversely arcuate spring member secured to said partition member in upright position and having frictional means at the edges thereof for engagement with the side walls of the box to maintain the adjusted position of the partition member, and other spring means on said partition member for exerting endwise pressure on said series of slides.

VALENTINE F. GREAVES.